Figure 1:
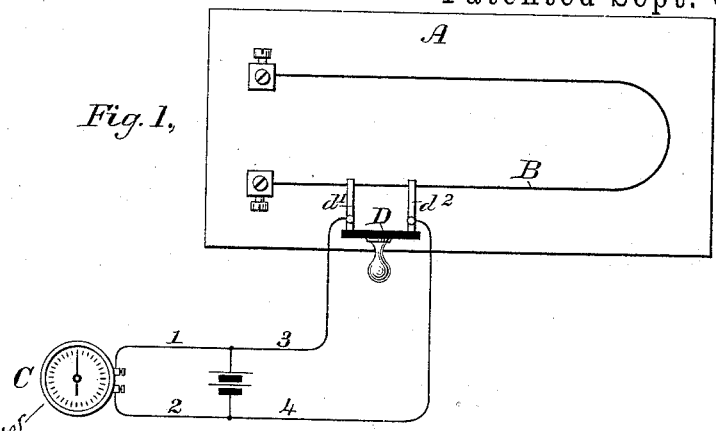

(No Model.)

E. P. THOMPSON.
METHOD OF TESTING ELECTRIC LIGHT FILAMENTS.

No. 369,665. Patented Sept. 6, 1887.

Witnesses
Carrie E. Davidson
Carrie E. Ashley

Inventor
E. P. Thompson
By his Attorneys
Pope & Edgecomb

UNITED STATES PATENT OFFICE.

EDWARD P. THOMPSON, OF ELIZABETH, NEW JERSEY.

METHOD OF TESTING ELECTRIC-LIGHT FILAMENTS.

SPECIFICATION forming part of Letters Patent No. 369,665, dated September 6, 1887.

Application filed September 15, 1886. Serial No. 213,569. (No model.)

*To all whom it may concern:*

Be it known that I, EDWARD P. THOMPSON, a citizen of the United States, residing in Elizabeth, in the county of Union and State of New Jersey, have invented certain new and useful Improvements in Methods of Testing Electric-Light Filaments, of which the following is a specification.

The object of the invention is to provide means for conveniently testing filaments which have been carbonized for incandescent electric lights and determining whether or not they are perfect throughout their entire lengths.

It has been customary to test the carbons by sending an electric current through the same and noting whether or not the resistance offered is normal. It may chance, however, that at some point in the length of the filament the resistance is increased by a defect, and that through another portion the resistance is correspondingly decreased by reason of an undue enlargement, so that the total resistance might be normal, owing to the balancing of two defects. The present invention consists in providing means for measuring the resistance of different sections of the filament, and thereby avoiding the possibility of an increase being balanced by a decrease in the resistance.

The invention may be carried out in two or three different ways. For instance, a battery may be provided with two circuits, one through the galvanometer and the other through the conductors leading to insulated arms or contact-points designed to be placed against the filaments, and thereby include in the circuit a section of the same, dependent for its length upon the distance of the arms from each other. By moving the handle carrying these arms along the length of the filament it may be noted by means of the galvanometer whether or not the resistance at any time included between the arms varies. Another method consists in sending a current continuously through the filament and connecting the galvanometer-circuit with the two arms of the circuit-closer, and then, by moving the latter along the length of the filament, noticing whether the galvanometer is deflected. Still another method consists in substituting for the galvanometer, in the last instance, two automatic electric bells, one of which is constructed to respond to currents of a normal strength, while the other is formed to respond only when currents of more than normal strength are sent through the circuit by reason of an abnormal resistance in the portion of the filament coming between the two arms of the circuit-closer.

Figure 2:
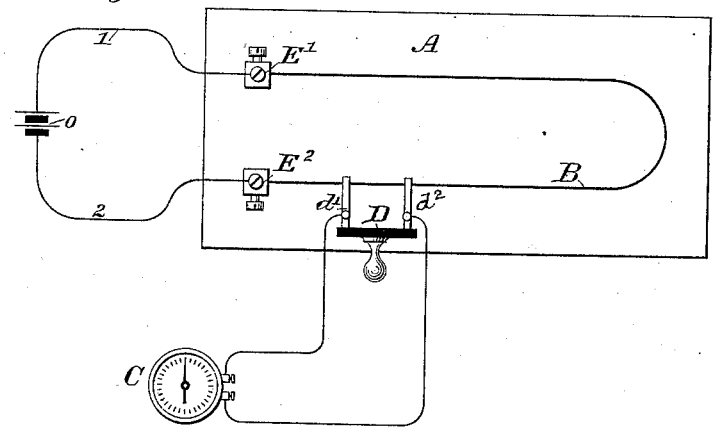
Figure 3:
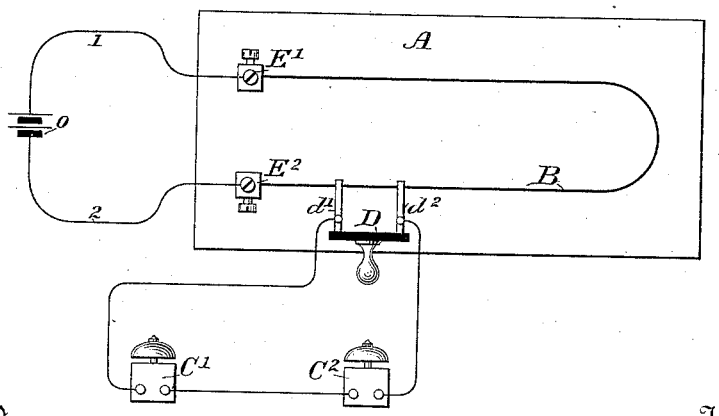

In the accompanying drawings, Figures 1, 2, and 3 illustrate different methods of carrying out the invention.

Referring to the figures, A represents a suitable table or support upon which the filaments may be placed. In Fig. 1 the battery $o$ has conductors 1 and 2 leading from its respective poles through a galvanometer, C. Other conductors, 3 and 4, lead from the respective poles to two insulated contact arms or points, $d'$ and $d^2$, of a circuit-closing device, D. The arms may be placed at any desired distance apart, preferably about an inch. When placed in contact with the filament B, the circuit of the battery is completed through the portion of the filament which is between the arms. It having been determined at what point the galvanometer shall stand when the resistance of the included section of the filament is normal, the circuit-closing device is moved gradually along the length of the filament, and by noting the galvanometer it may be readily determined whether the resistance at any point in the length of the filament is greater or less than it should be and to what degree the filament is imperfect.

In Fig. 2 the poles of the battery $o$ are respectively connected by the conductors 1 and 2 with the clamps $E'$ $E^2$, which are applied to the ends of the filament B. The galvanometer C is connected in circuit with the two arms $d'$ $d^2$ of the circuit-closer D. If, now, the circuit-closer be moved along the filament, any variation in the resistance will be indicated upon the galvanometer by reason of the varying current which is shunted through it.

In Fig. 3 the galvanometer is replaced by two signal-bells, $C'$ and $C^2$. The former responds to currents of such strength as will be shunted through the arms $d'$ and $d^2$ when the resistance of the included section of the filament is normal. Should the resistance become less than normal, then the current shunted will be insufficient to ring the bell, and thus it will give a corresponding indication by its cessation. If, on the other hand, its resistance becomes too great, a greater amount of current will be shunted and the second bell, $C^2$, will ring, thereby giving an indication that the filament is defective by reason of an abnormal resistance at some point between the two arms.

I claim as my invention—

1. The hereinbefore-described method of testing a filament for incandescent lights, which consists in dividing an electric current through an independent circuit and through different sections of the filament of constant length successively and indicating the relative values of the current traversing the two circuits, substantially as described.

2. The hereinbefore-described method of testing electric-light filaments, which consists in successively including different sections of the same of constant length in an electric circuit and indicating the relative strengths of the currents traversing such sections.

3. A device for testing electric-light filaments, consisting of an audible signaling device, two contact-arms, a handle for the same, conductors leading from said signaling device to said arms, and a battery for operating the signaling device.

In testimony whereof I have hereunto subscribed my name this 17th day of August, A. D. 1886.

EDWARD P. THOMPSON.

Witnesses:
DANL. W. EDGECOMB,
CHARLES A. TERRY.